United States Patent Office 2,844,996
Patented July 29, 1958

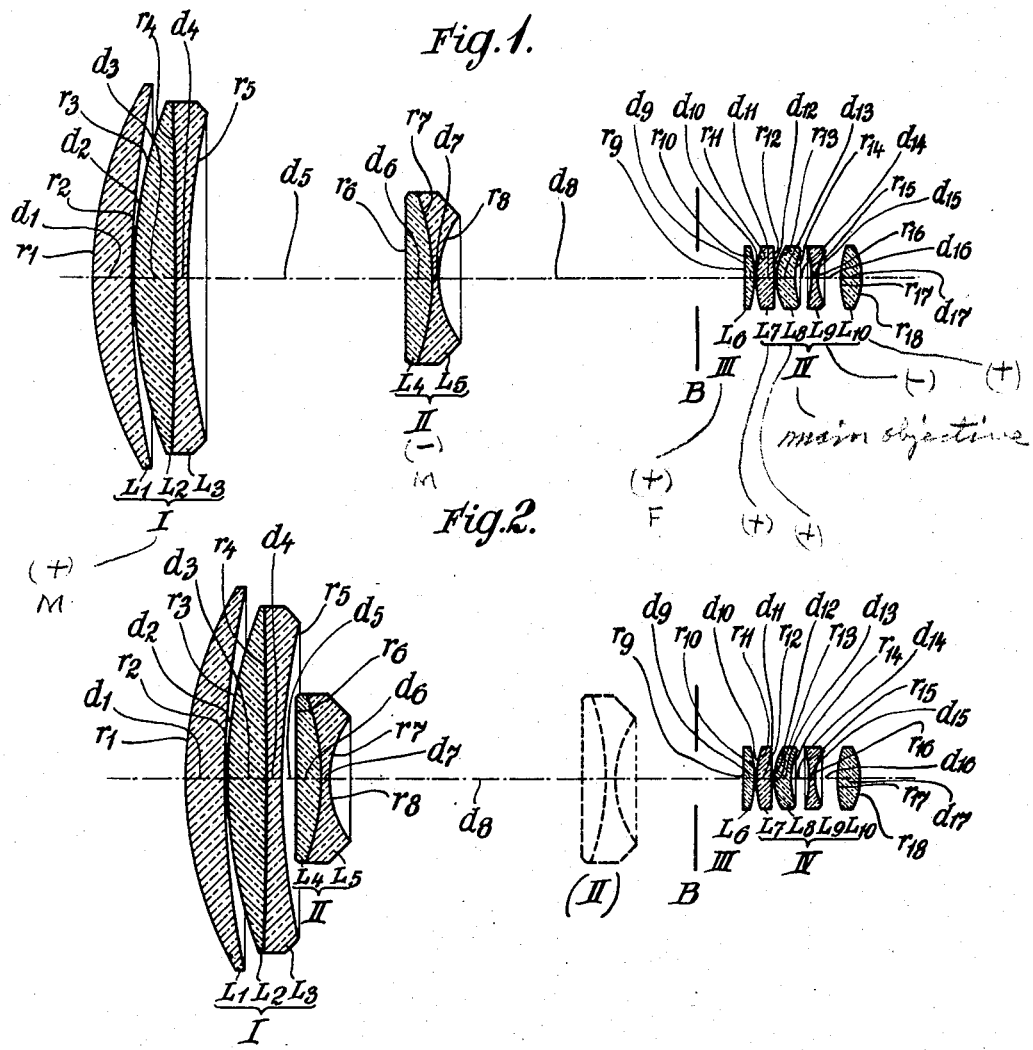

2,844,996

VARIFOCAL PHOTOGRAPHIC OR CINEMATOGRAPHIC OBJECTIVE

Günter Klemt, Kreuznach, Rhineland, Germany, assignor to Jos. Schneider & Co., Kreuznach, Rhineland, Germany, a German firm Application February 3, 1956, Serial No. 563,355

Claims priority, application Germany February 8, 1955

3 Claims. (Cl. 88—57)

The present invention relates to a varifocal objective, especially for photographic or cinematographic cameras.

A known type of varifocal objective consists of a multi-component main objective and a three-element front attachment therefor, the two outer elements of this attachment (i. e. the one facing the main objective and the one on the object side) being positively refracting and enclosing between them a negatively refracting element which may be composed of two cemented lenses of opposite refractivity and which is displaceable in direction of the optical axis for varying the focal length of the system.

Such known systems have been designed with a relative aperture of 1:2.8 and with a focal range (i. e. a ratio of minimum to maximum focal length) of approximately 1:3. As the negative intermediate element is displaced to vary the focal length, the positive front element of the attachment must also be moved in order to maintain constant the image distance of the entire system. The overall physical length of the system is greatest upon its adjustment to a median focal length, the front element being then in an extreme forward position; for greater and lesser focal lengths this front element moves toward the succeeding elements in a non-linear manner.

My invention has for its principal object the provision of a varifocal system of the general character described above wherein, however, a focal range of about 1:4 is obtainable without sacrificing the relatively high aperture ratio of 1:2.8.

This object is realized, in accordance with the present invention, by the use of a main objective of four air-spaced lenses, which may be described as a modified Taylor-type lens assembly, in combination with a front attachment whose movable positive front component (positioned on the side of the longer light rays) consists of two air-spaced lens members whereas the fixed positive rear component is a single lens, the negatively refracting movable intermediate component being composed of two cemented lenses of opposite refractivity and being substantially plano-concave or in the shape of a negative meniscus. Thus, this negatively refracting component may be defined as a lens element with one distinctly concave surface and a substantially non-concave (i. e. plane or slightly convex) second surface.

I have found that a system of this character offers an increased focal range and improved picture quality over the range hitherto available, especially if the two lens members constituting the movable positive component of the attachment are in the form of positive menisci facing the object side of the system (i. e. the side of the longer light rays) with their convex surface, the forward one of these two members being a single lens whereas the other member is composed of two oppositely refracting lenses so cemented together that the negative lens turns its concavity toward the subsequent movable negative component.

By these measures it has been possible to reduce considerably the aberrations and distortion inherent in verifocal systems of the prior art. For the purpose of minimizing the residual aberration of the main objective, it has been found advantageous to design its four air-spaced components as single lenses including positive front and rear lenses (preferably of biconvex shape), a biconcave negative lens adjacent the positive rear lens and, immediately back of the positive front lens, a positive meniscus turning its concave surface toward the succeeding biconcave lens.

According to a further feature of this invention, a favorable dimensioning of the large positive lens members in the movable front component of the attachment is made possible by positioning the diaphragm of the system ahead of the fixed positive component of the attachment at a location which is approximately midway between this fixed component and the position occupied by the movable negative component in the maximum-focal-length position of the attachment.

Reference will now be made to the accompanying drawing in which:

Fig. 1 illustrates a varifocal system according to the invention in a position of median focal length; and Fig. 2 illustrates the same system in a position of minimum (solid lines) and of maximum (dotted lines) focal length.

The drawing shows the three components I, II, III of the front attachment preceding the main objective IV. The movable positive component I consists of a single meniscus $L_1$, with radii $r_1$, $r_2$ and thickness $d_1$, and a compound meniscus composed of a positive member $L_2$ (radii $r_3$, $r_4$ and thickness $d_3$) and of a negative member $L_3$ (radii $r_4$, $r_5$ and thickness $d_4$) whose spacing from lens $L_1$ is designated $d_2$. The movable intermediate component II is a plano-concave compound lens composed of a positive member $L_4$ (radii $r_6$, $r_7$ and thickness $d_6$) and of a negative member (radii $r_7$, $r_8$ and thickness $d_7$) spaced by a variable distance $d_5$ from lens element $L_2$, $L_3$. The fixed rear component III is a single positive lens $L_6$ spaced from component II by a variable distance $d_8$ and having radii $r_9$, $r_{10}$ and thickness $d_9$.

Spaced from lens $L_6$ by a distance $d_{10}$ is the biconvex front lens $L_7$ of lens assembly IV, its radii being designated $r_{11}$, $r_{12}$ and its thickness $d_{11}$; the air space $d_{12}$ separates lens $L_7$ from the next lens $L_8$ (radii $r_{13}$, $r_{14}$ and thickness $d_{13}$) which has the shape of a positive meniscus; there follows, with a spacing $d_{14}$, a biconcave lens $L_9$ having radii $r_{15}$, $r_{16}$ and thickness $d_{15}$; finally, a biconvex lens $L_{10}$ with radii $r_{17}$, $r_{18}$ and thickness $d_{17}$, spaced from lens $L_9$ by a distance $d_{16}$, completes the assembly. A diaphragm B is interposed between components II and III.

The position shown in Fig. 1, in which the front component I has its maximum distance from the main objective IV, corresponds to a median focal length which for convenience has been given the numerical value of $f=100$. The position of front component I shown in Fig. 2 corresponds to a minimum focal length $f'=50$, with the intermediate component II in its forward position shown in full lines, and also to a maximum focal length $f''=200$ with intermediate component II in its rear position shown in broken lines. Numerical values for the radii, thicknesses and air spaces of the various lenses, applying to the position of Fig. 1, are given in the following table which also shows the refractive indices $n_d$ and the Abbé numbers $\nu_d$:

| lenses | | radii | thickness and spacings | $n_d$ | $\nu_d$ |
|---|---|---|---|---|---|
| I | L₁ | $r_1 = + 287.70$ | $d_1 = 26.55$ | 1.62041 | 60.3 |
| | | $r_2 = +1,325.00$ | $d_2 = 0.60$ | air space | |
| | L₂ | $r_3 = + 332.95$ | $d_3 = 25.33$ | 1.62041 | 60.3 |
| | L₃ | $r_4 = -1,953.75$ | $d_4 = 12.15$ | 1.76182 | 26.5 |
| | | $r_5 = + 532.00$ | $d_5 = 140.05$ | air space (variable) | |
| II | L₄ | $r_6 = \infty$ | $d_6 = 17.00$ | 1.75520 | 27.5 |
| | L₅ | $r_7 = - 168.88$ | $d_7 = 4.85$ | 1.62041 | 60.3 |
| | | $r_8 = + 71.00$ | $d_8 = 209.20$ | air space (variable) | |
| III—L₆ | | $r_9 = +5,582.50$ | $d_9 = 5.00$ | 1.62041 | 60.3 |
| | | $r_{10} = - 301.70$ | $d_{10} = 1.25$ | air space | |
| IV | L₇ | $r_{11} = + 73.43$ | $d_{11} = 11.52$ | 1.62041 | 60.3 |
| | | $r_{12} = -1,195.00$ | $d_{12} = 0.23$ | air space | |
| | L₈ | $r_{13} = + 43.80$ | $d_{13} = 11.35$ | 1.62041 | 60.3 |
| | | $r_{14} = + 56.23$ | $d_{14} = 7.75$ | air space | |
| | L₉ | $r_{15} = - 146.40$ | $d_{15} = 3.23$ | 1.69895 | 30.1 |
| | | $r_{16} = + 37.75$ | $d_{16} = 15.58$ | air space | |
| | L₁₀ | $r_{17} = + 104.88$ | $d_{17} = 12.28$ | 1.63854 | 55.5 |
| | | $r_{18} = - 57.55$ | | | |
| | | | total length = 503.92 | | |

The above system has an invariable back-focal distance of $s = 68.33$ and an aperture ratio of 1:2.8. The spacing of the diaphragm B from the forward surface of lens L₆ (radius $r_9$) equals 32.5, this being about half the minimum distance between components II and III as shown in Fig. 2.

I claim:

1. A varifocal lens system comprising an axially movable positive front component consisting of a forward lens member and a rear lens member air-spaced from each other, said rear lens member being composed of a positive and a negative lens cemented together; an axially movable negative intermediate component also composed of a positive and a negative lens cemented together and having a substantially non-concave forward surface and a distinctly concave rear surface; a fixed rear component in the form of a single positive lens; and a main objective comprising four single air-spaced lenses following said rear component and including a positive first lens, a second lens in the shape of a positive meniscus, a biconcave third lens and a positive fourth lens, said forward lens member and said rear lens member being each a positive meniscus turning its concave side toward said intermediate component, said second lens turning its concave surface toward said third lens.

2. A system according to claim 1, further comprising diaphragm means between said intermediate and rear components, said diaphragm means being disposed substantially midway between said rear component and the location of said intermediate component in a position of maximum focal length.

3. A system according to claim 1, wherein the forward lens member L₁ of said front component, the positive lens L₂ and the negative lens L₃ of the rear lens member of said front component, the positive lens L₄ and the negative lens L₅ of said intermediate component, the single lens L₆ of said rear component, and the four single lenses L₇, L₈, L₉, L₁₀ following said rear component have radii, thicknesses and spacings whose numerical values in a position of adjustment corresponding to a median focal length of the system, based upon a numerical value of 100 for said median focal length, along with the refractive indices $n_d$ and Abbé numbers $\mu_d$ of all of said lenses L₁–L₁₀ are substantially as given in the following table:

| lenses | radii | thickness and spacings | $n_d$ | $\nu$ |
|---|---|---|---|---|
| L₁ | $r_1 = + 287.70$ | $d_1 = 26.55$ | 1.62041 | 60.3 |
| | $r_2 = +1,325.00$ | $d_2 = 0.60$ | air space | |
| L₂ | $r_3 = + 332.95$ | $d_3 = 25.33$ | 1.62041 | 60.3 |
| L₃ | $r_4 = -1,953.75$ | $d_4 = 12.15$ | 1.76182 | 26.5 |
| | $r_5 = + 532.00$ | $d_5 = 140.05$ | air space (variable) | |
| L₄ | $r_6 = \infty$ | $d_6 = 17.00$ | 1.75520 | 27.5 |
| L₅ | $r_7 = - 168.88$ | $d_7 = 4.85$ | 1.62041 | 60.3 |
| | $r_8 = + 71.00$ | $d_8 = 209.20$ | air space (variable) | |
| L₆ | $r_9 = +5,582.50$ | $d_9 = 5.00$ | 1.62041 | 60.3 |
| | $r_{10} = - 301.70$ | $d_{10} = 1.25$ | air space | |
| L₇ | $r_{11} = + 73.43$ | $d_{11} = 11.52$ | 1.62041 | 60.3 |
| | $r_{12} = -1,195.00$ | $d_{12} = 0.23$ | air space | |
| L₈ | $r_{13} = + 43.80$ | $d_{13} = 11.35$ | 1.62041 | 60.3 |
| | $r_{14} = + 56.23$ | $d_{14} = 7.75$ | air space | |
| L₉ | $r_{15} = - 146.40$ | $d_{15} = 3.23$ | 1.69895 | 30.1 |
| | $r_{16} = + 37.75$ | $d_{16} = 15.58$ | air space | |
| L₁₀ | $r_{17} = + 104.88$ | $d_{17} = 12.28$ | 1.63854 | 55.5 |
| | $r_{18} = - 57.55$ | | | |

References Cited in the file of this patent

UNITED STATES PATENTS

| 2,612,077 | Albrecht | Sept. 30, 1952 |
| 2,649,025 | Cook | Aug. 18, 1953 |
| 2,696,758 | Angenieux | Dec. 14, 1954 |
| 2,718,817 | Back et al. | Sept. 27, 1955 |
| 2,732,763 | Back et al. | Jan. 31, 1956 |

FOREIGN PATENTS

| 597,354 | Germany | May 25, 1934 |